(12) United States Patent
Igari et al.

(10) Patent No.: US 8,993,115 B2
(45) Date of Patent: *Mar. 31, 2015

(54) PRESS-MOLDING GLASS MATERIAL, METHOD OF MANUFACTURING PRESS-MOLDING GLASS MATERIAL, AND METHOD OF MANUFACTURING OPTICAL ELEMENT

(75) Inventors: Takashi Igari, Shinjuku-ku (JP); Takeshi Ishimine, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 232 days.
This patent is subject to a terminal disclaimer.

(21) Appl. No.: 13/203,806

(22) PCT Filed: Dec. 16, 2010

(86) PCT No.: PCT/JP2010/072700
§ 371 (c)(1),
(2), (4) Date: Nov. 14, 2011

(87) PCT Pub. No.: WO2011/081031
PCT Pub. Date: Jul. 7, 2011

(65) Prior Publication Data
US 2012/0177914 A1    Jul. 12, 2012

(30) Foreign Application Priority Data
Dec. 28, 2009 (JP) ................................. 2009-298210

(51) Int. Cl.
*B32B 17/06* (2006.01)
*C23C 14/34* (2006.01)
(Continued)

(52) U.S. Cl.
CPC ................. *C03B 40/00* (2013.01); *C03B 11/08* (2013.01); *C03C 3/21* (2013.01); *C03C 17/245* (2013.01); *G02B 1/10* (2013.01); *C03C 2217/213* (2013.01)
USPC ........... 428/432; 428/428; 428/220; 428/409; 204/192.1; 65/102

(58) Field of Classification Search
USPC ......... 428/409, 426, 428, 432, 688, 689, 702, 428/220; 204/192.1; 65/102
See application file for complete search history.

(56) References Cited

U.S. PATENT DOCUMENTS 8,486,536 B2 *  7/2013  Zou et al. ...................... 428/428
8,703,295 B2 *  4/2014  Zou et al. ...................... 428/432
(Continued)

FOREIGN PATENT DOCUMENTS

CN          1579980 A      2/2005
CN          1604412 A      4/2005
(Continued)

OTHER PUBLICATIONS

International Preliminary Report on Patentability and International Search Opinion corresponding to PCT/JP2010/072700, filed Dec. 16, 2010.
(Continued)

*Primary Examiner* — David Sample
*Assistant Examiner* — Lauren Colgan
(74) *Attorney, Agent, or Firm* — Sughrue Mion, PLLC

(57) ABSTRACT

An aspect of the present invention relates to a press-molding glass material, which comprises a core part comprised of optical glass and a silicon oxide film of less than 15 nm in thickness covering at least a portion of the core part, the portion being to be an optically functional surface, as well as has a surface free energy as measured by a three-liquid method of equal to or lower than 75 mJ/m$^2$. A further aspect of the present invention relates to a method of manufacturing a press-molding glass material comprising a core part comprised of optical glass and a silicon oxide film covering at least a portion of the core part to be an optically functional surface. The silicon oxide film is less than 15 nm in thickness, and film formation processing is conducted with a film-forming material comprised of SiO$_2$ in an atmosphere with an oxygen content falling within a range of equal to or higher than 5 volume percent but less than 20 volume percent to form the silicon oxide film on the above portion of the core part.

8 Claims, 5 Drawing Sheets

(51) Int. Cl.
    *C03B 23/00*      (2006.01)
    *B32B 7/02*      (2006.01)
    *C23C 14/10*      (2006.01)
    *C03B 40/00*      (2006.01)
    *C03B 11/08*      (2006.01)
    *C03C 3/21*      (2006.01)
    *C03C 17/245*      (2006.01)
    *G02B 1/10*      (2006.01)

(56) References Cited

U.S. PATENT DOCUMENTS

| 2005/0028558 | A1 | 2/2005 | Sato | |
| 2012/0135199 | A1* | 5/2012 | Satou et al. | 428/172 |

FOREIGN PATENT DOCUMENTS

| JP | 2-1779 | B2 | | 1/1990 |
| JP | 4-284630 | A | | 10/1992 |
| JP | 6-64942 | A | | 3/1994 |
| JP | 2002-201045 | A | | 7/2002 |
| JP | 2005-67999 | A | | 3/2005 |
| JP | 2005-239434 | A | | 9/2005 |
| WO | WO2007114170 | | * | 10/2007 |
| WO | WO2010131741 | | * | 11/2010 |
| WO | WO2010134546 | | * | 11/2010 |

OTHER PUBLICATIONS

Office Action dated Jan. 22, 2014, issued in the corresponding Chinese Patent Application No. 201080009320.3 with English translation.

Chinese Office Action dated May 14, 2013, issued in Chinese Application No. 201080009320.3.

Japanese Office Action dated Jun. 4, 2013, issued in Japanese Application No. 2009-298210.

Office Action issued in corresponding Chinese Patent Application No. 2010800093203 dated Sep. 24, 2014.

Office Action issued in corresponding Japanese Patent Application No. 2010800093203 dated Sep. 24, 2014.

* cited by examiner

PRESS-MOLDING GLASS MATERIAL, METHOD OF MANUFACTURING PRESS-MOLDING GLASS MATERIAL, AND METHOD OF MANUFACTURING OPTICAL ELEMENT

CROSS-REFERENCE TO RELATED APPLICATIONS

This application claims the benefit of priority to Japanese Patent Application No. 2009-298210, filed on Dec. 28, 2009, which is expressly incorporated herein by reference in its entirety.

TECHNICAL FIELD

The present invention relates to a press-molding glass material that can be used to obtain a glass optical element by precision mold pressing; to a method of manufacturing the press-molding glass material; and to a method of manufacturing an optical element employing either the above press-molding glass material or the press-molding glass material obtained by the above manufacturing method.

BACKGROUND ART

The method of press molding (called the "precision press molding method", "precision mold pressing method" etc.) a molding material (referred to as a "press-molding glass material" or "glass preform", hereinafter) by means of an upper mold and lower mold having opposed molding surfaces is a known method of manufacturing optical elements such as glass lenses. In this method, a piece of optical glass that has been solidified into a prescribed shape from a molten state, or a piece of optical glass that has been polished into a prescribed shape, is placed within a pressing mold and hot press molded to obtain a glass optical element. The precision press molding method makes it possible to inexpensively obtain high-performance lenses because the use of a precisely machined pressing mold obviates the need for post-processing such as polishing following press molding.

However, in the course of molding the glass optical element by the precision press molding method, the press-molding glass material and the molding surfaces of the mold adhere in a high temperature state. Thus, there are problems in that chemical reactions take place and fusion occurs at their interface, compromising mold release.

A method of solving such problems is proposed in Reference 1 (Japanese Unexamined Patent Publication (KOKAI) Heisei No. 8-217468), which is expressly incorporated herein by reference in its entirety, in the form of the reheat pressing method, for example, which employs a glass material for molding that is obtained by forming a carbon film by the thermal decomposition of a hydrocarbon gas on the surface of a glass preform to prevent fusion of the molds to the glass preform.

Reference 2 (Japanese Unexamined Patent Publication (KOKAI) Heisei No. 8-259241), which is expressly incorporated herein by reference in its entirety, discloses a method of using a glass material for molding obtained by forming a hydrocarbon film 20 nm to 30 nm in thickness on the surface of a glass preform by inducing a high-frequency electrical discharge using methane gas, or drawing out an ion beam using methane gas and hydrogen gas. It is described that using such a glass material for molding makes it possible to achieve a good mold release property, even in the press molding of lens shapes that do not readily lend themselves to mold release.

Reference 3 (Japanese Unexamined Patent Publication (KOKAI) Heisei No. 9-286625) and English language family member U.S. Pat. No. 5,851,252, which are expressly incorporated herein by reference in their entirety, disclose the method of employing a glass material for molding obtained by forming a carbon film of less than 5 nm on the surface after subjecting a glass preform to methane plasma processing to enhance the mold release property between the metal molds and the molded product.

In the methods described in References 1 to 3, a thin carbon-based film is formed on the glass preform. However, the glasses containing components that impart high refractive indexes in the form of W, Ti, Bi, Nb, and the like to achieve the high refractive indexes demanded of glass lenses in recent years tend to react with such a carbon-based thin film in the elevated temperature environment during press molding. This is because these high refractive index-imparting components reduce readily, tending to undergo oxidation reduction reactions due to their ability to assume multiple valences while present as glass components, and in the process of press molding, are thought to cause various interface reactions in the process of deforming while being pressed by the molds.

By contrast, in addition to thin carbon-based films, it is known that silicon oxide films can be formed on glass preforms.

For example, Reference 4 (Japanese Examined Patent Publication (KOKOKU) Heisei No. 2-1779), which is expressly incorporated herein by reference in its entirety, describes achieving a lens having good optical quality by forming an $SiO_2$ film of 50 to 2,000 Angstroms, desirably 100 to 1,000 Angstroms, by vapor deposition or sputtering on a PbO-containing glass or alkali borosilicate glass.

Reference 5 (Japanese Unexamined Patent Publication (KOKAI) Heisei No. 7-118025), which is expressly incorporated herein by reference in its entirety, describes a method of blocking volatile components from a glass material by vapor depositing a 100 Angstrom $SiO_2$ film on the glass material in regions where the gap between the glass material and the lower mold during pressing is equal to or less than 0.1 mm.

Reference 6 (Japanese Unexamined Patent Publication (KOKAI) Heisei No. 8-198631), which is expressly incorporated herein by reference in its entirety, describes a method of forming a surface layer by heat treating a glass material and forming a 5 to 50 nm coating containing 70 to 90 mass percent of $SiO_2$ thereover by vapor deposition or sputtering.

SUMMARY OF THE INVENTION

Since a silicon oxide film is poor in reactivity to the above readily reduced components, it makes it possible to avoid the generation of defects due to reaction with glasses containing these readily reduced components, such as occurs with carbon-based thin films. However, research by the present inventors has revealed that conventional silicon oxide films such as those described in Patent References 4 to 6 still do not adequately inhibit fusion between the glass molding material for press molding and the molds. In precision press molding in particular, when the press-molding glass material and the molds are in contact for an extended period at high temperature, the yield drops significantly, and in some cases, the above fusion makes it difficult to obtain the optical element itself.

Accordingly, the object of the present invention is to provide a press-molding glass material that makes it possible to obtain a high-quality glass optical element by the precision press molding method.

The present inventors conducted extensive research into achieving the above object, resulting in the following discoveries:

(1) In a press-molding glass material having a silicon oxide film on its surface, a good correlation was found between the surface free energy as measured by the three-liquid method and the yield during press molding. Among press-molding glass materials having a silicon oxide film of less than 15 nm in thickness on the surface thereof, those with a surface free energy as measured by the three-liquid method of equal to or less than 75 mJ/m$^2$ could enhance the yield during press molding.

(2) Conventionally, the plasma CVD method based on a mixed gas of an organic silane based gas and an oxidizing gas (for example, see Japanese Unexamined Patent Publication (KOKAI) Heisei No. 9-102491, which is expressly incorporated herein by reference in its entirety), the sputtering method employing an SiC target in an argon-containing oxygen atmosphere (for example, see Japanese Unexamined Patent Publication (KOKAI) No. 2004-84033, which is expressly incorporated herein by reference in its entirety), the laser abrasion method in which a silicon target is employed in an oxygen-containing gas (for example, see Japanese Unexamined Patent Publication (KOKAI) No. 2002-93801 and English language family member US2002/0031917A1, which are expressly incorporated herein by reference in their entirety), and the like are known as methods of forming silicon oxide films such as thin films of $SiO_2$. As described above, conventionally, the method of forming a film in an oxygen-containing atmosphere using a film forming material comprised of $SiO_2$ was not known as a method of forming a silicon oxide film. (Even above References 4 to 6, which disclose the forming of silicon oxide films on glass preforms, do not describe such a method.)

By contrast, the present inventors discovered that it was possible to improve the yield during precision press molding with a press-molding glass material on the surface of which was formed a silicon oxide film formed under an atmosphere containing a mixed gas of oxygen and an inert gas that contained equal to or higher than 5 volume percent but less than 20 volume percent of oxygen using a film-forming material comprised of $SiO_2$. This was attributed to the following reasons.

The surface free energy measured by the three-liquid method includes nonpolar components, hydrogen bond components, and polar components comprised of dipolar components. However, a marked reduction in hydrogen bond components was found in the silicon oxide film formed by the above method. This was thought to have occurred because, as a result of oxygen contained in the film-forming atmosphere being incorporated into the silicon oxide film, a silicon oxide film containing more oxygen than the silicon oxide films formed by conventional film-forming methods was formed. As a result, the fact that the surface free energy as measured by the three-liquid method was lower than in conventional press-molding glass materials having silicon oxide films was thought to contribute to improving the yield.

The present invention was devised on the basis of the above discovery.

An aspect of the present invention relates to:

a press-molding glass material, which comprises a core part comprised of optical glass and a silicon oxide film of less than 15 nm in thickness covering at least a portion of the core part, the portion being to be an optically functional surface, as well as has a surface free energy as measured by a three-liquid method of equal to or lower than 75 mJ/m$^2$.

The optical glass may comprise at least one readily reduced component selected from the group consisting of W, Ti, Bi, and Nb.

The optical glass may comprise, denoted as mole percentages, 10 to 45 percent of $P_2O_5$, 3 to 35 percent of $Nb_2O_5$, 0 to 35 percent of $Li_2O$, 0 to 25 percent of $TiO_2$, 0 to 20 percent of $WO_3$, 0 to 40 percent of $Bi_2O_3$, 0 to 20 percent of $B_2O_3$, 0 to 25 percent of $BaO$, 0 to 25 percent of $ZnO$, 0 to 50 percent of $Na_2O$, 0 to 20 percent of $K_2O$, 0 to 15 percent of $Al_2O_3$, 0 to 15 percent of $SiO_2$, and 0 to 10 percent of F relative to the total quantity of oxygen.

A further aspect of the present invention relates to:

a method of manufacturing a press-molding glass material comprising a core part comprised of optical glass and a silicon oxide film covering at least a portion of the core part to be an optically functional surface, wherein the silicon oxide film is less than 15 nm in thickness;

the method comprises conducting film formation processing with a film-forming material comprised of $SiO_2$ in an atmosphere with an oxygen content falling within a range of equal to or higher than 5 volume percent but less than 20 volume percent to form the silicon oxide film on the above portion of the core part.

The film formation processing may be conducted by a sputtering method.

The above-described press-molding glass material may be manufactured by the above manufacturing method.

A still further aspect of the present invention relates to a method of manufacturing an optical element, which comprises heating and precision press molding with a pressing mold the above press-molding glass material or a press-molding glass material manufactured by the above manufacturing method.

The present invention makes it possible to produce high-quality optical elements by precision press molding in large quantities and at high yields. Further, the present invention can provide inexpensively a high-quality lens with a high refractive index because even high-refractive-index glass materials that have conventionally been difficult to press mold can be used in precision press molding.

PRESS-MOLDING GLASS MATERIAL

Figure 1:
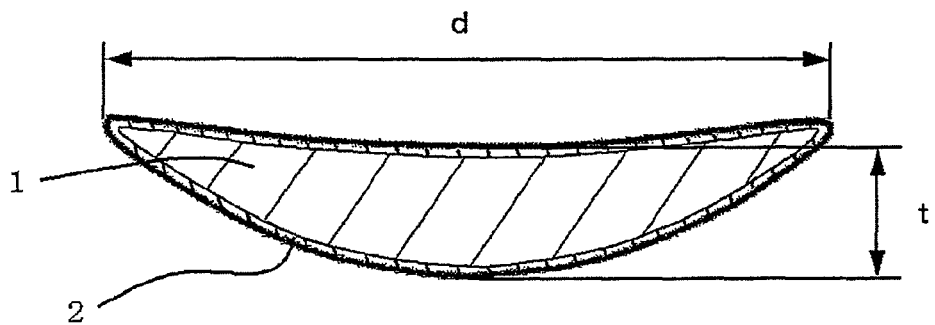
FIG. 1 is a sectional view illustrating an embodiment of the press-molding glass material according to the present invention.

The press-molding glass material of the present invention comprises a core part comprised of optical glass and a silicon oxide film of less than 15 nm in thickness covering at least a portion of the core part, the portion being to be an optically functional surface, as well as has a surface free energy as measured by a three-liquid method of equal to or lower than 75 mJ/m$^2$.

The press-molding glass material of the present invention makes it possible to inhibit fusing of the press-molding glass material and the pressing molds during press molding, thereby raising the yield and permitting the quantity production of high-quality optical elements. It is also possible to extend the service life of the mold. Accordingly, the press-molding glass material of the present invention can markedly enhance productivity in the manufacturing of optical elements by precision press molding.

The press-molding glass material of the present invention will be described in greater detail below.

The press-molding glass material of the present invention has a silicon oxide film covering at least a portion that is to be an optically functional surface of a core part comprised of optical glass. The silicon oxide film can also be provided so as to cover the front surface of the core part comprising the portion that is to be an optically functional surface.

With the above silicon oxide film, the press-molding glass material of the present invention is imparted with surface properties resulting in a surface free energy of equal to or lower than 75 mJ/m$^2$ as measured by the three-liquid method. When the surface free energy is equal to or lower than 75 mJ/m$^2$, precision press molding becomes possible without the press-molding glass material fusing to the molds. Thus, the yield can rise in the manufacturing of optical elements and a longer mold lifetime can be achieved. In contrast, when the surface free energy exceeds 75 mJ/m$^2$, pronounced fusion of the press-molding glass material and the molds occurs during precision press molding, and precision press molding productivity drops precipitously. From the perspective of effectively inhibiting fusion to the molds, the surface free energy of the press-molding glass material of the present invention is preferably equal to or lower than 72 mJ/m$^2$. From the perspective of inhibiting fusion of the press-molding glass material to the molds, the surface free energy is desirably as low as possible. Although the lower limit is not specifically limited, the method of manufacturing a press-molding glass material of the present invention, described further below, makes it possible to manufacture a press-molding glass material with a surface free energy of about 50 mJ/m$^2$.

The surface free energy that is measured by the three-liquid method and used as an index of the surface properties of the press-molding glass material in the present invention will be described below.

The surface free energy that is measured by the two-liquid method is obtained as the sum of the dispersion force of a solid or liquid and the polar interaction force of a solid or liquid (for example, see Japanese Unexamined Patent Publication (KOKAI) No. 2005-225707 of the present inventors, which is expressly incorporated herein by reference in its entirety). By contrast, the surface free energy that is measured by the three-liquid method expands Fowkes theory of nonpolar intermolecular forces to components based on intermolecular forces relating to polarity or hydrogen bonds. According to the expanded Fowkes theory, the surface free energy γ of a given substance, as shown in equation (1) below, is given by the sum of a nonpolar component (dispersion component) $γ^a$ and a polar component comprised of a hydrogen bond component $γ^b$ and a dipolar component $γ^c$.

$$γ = γ^a + γ^b + γ^c \tag{1}$$

Further, the relation of equation (2) holds between the contact angle and the various components.

[Numeral 1]

$$γ_L(1+\cos θ) = 2\sqrt{γ_S^a γ_L^a} + 2\sqrt{γ_S^b γ_L^b} + 2\sqrt{γ_S^c γ_L^c} \tag{2}$$

In equation (2), $γ_L$ denotes the surface free energy of the liquid denoted by $γ^a_L + γ^b_L + γ^c_L$. $γ^a_L$ denotes the dispersion component of the surface free energy of the liquid. $γ^b_L$ denotes the dipolar component of the surface free energy of the liquid. $γ^c_L$ denotes the hydrogen bond component of the surface free energy of the liquid. $γ^a_S$ denotes the dispersion component of the surface free energy of a solid. $γ^b_S$ denotes the dipolar component of the surface free energy of a solid. And $γ^c_S$ denotes the hydrogen bond component of the surface free energy of a solid. θ denotes the contact angle.

In the present invention, the following three liquids are employed as standard substances. The surface free energy calculated by obtaining each component based on the determinant of the three rows and three columns constituted by the contact angle and various parameters is employed as an index of the surface properties of the press-molding glass material.

TABLE 1

| Standard substance | Parameters | | | |
| --- | --- | --- | --- | --- |
| | Dispersion component (mJ/m$^2$) | Dipoles (mJ/m$^2$) | Hydrogen bonds (mJ/m$^2$) | Total (mJ/m$^2$) |
| Ultrapure water | 21.8 | 25.5 | 25.5 | 72.8 |
| Glycerin | 34 | 5.3 | 42.5 | 81.8 |
| Diiodomethane | 50.8 | 0 | 0 | 50.8 |

So long as the surface free energy of the press-molding glass material of the present invention as measured by the three-liquid method is equal to or lower than 75 mJ/m$^2$, the composition of the silicon oxide film that is formed on the surface thereof is not specifically limited. A silicon oxide film composition that contains silicon dioxide ($SiO_2$) is stable, but there is no limitation to $SiO_2$. When a composition of $Si_xO_y$ is employed, compositions of about y/x=1 to 3 can exist. It suffices for the silicon oxide film to cover at least the portion of the core part where an optically functional surface of the optical element is formed when the press-molding glass material of the present invention is press molded to mold an optical element. The term "optically functional surface" means a region within the effective diameter of the optical lens, for example. When a silicon oxide film is provided so as to cover the entire surface of the core part, although also depending on the method of forming the silicon oxide film, there are cases where the surface glass layer thickness T1 at a spot to be an optically functional surface differs from the surface glass layer thickness T2 at a perimeter portion towards the outer circumference; the tendency is for T1≥T2.

In the present invention, attention is paid to the surface shape of the portion to be an optically functional surface. The film thickness that is specified in the present invention is T1. The above film thickness can be measured by elemental analysis of a cross-section of the glass material. It can also be specified based on the film forming conditions of the silicon oxide film.

The film thickness of the silicon oxide film present on the press-molding glass material of the present invention is less than 15 nm. This is because when the film thickness of the silicon oxide film is equal to or greater than 15 nm, even when the surface free energy as measured by the three-liquid method is equal to or lower than 75 mJ/m$^2$, it is sometimes impossible to inhibit fusing to the mold. That is because a silicon oxide film that is equal to or greater than 15 nm in thickness does not achieve adequate viscosity at the pressing temperature, causing cracks to develop during pressing and resulting in glass exposed through the gaps created by these cracks fusing to the molds. The present inventors surmised that this was caused by the disappearance of the quantum size effect. The lower limit of the film thickness is desirably equal to or greater than 1 nm. When the film thickness is less than 1 nm, the silicon oxide film drops off locally, resulting in a patchy film and cases where the glass material fuses to the molds. By contrast, a film thickness of equal to or greater than 1 nm can result in uniform film formation. The upper limit, as set forth above, is less than 15 nm. From the perspective of reducing the influence on the optical characteristics of the optical element obtained following press molding, it is desirably 10 nm±30 percent, preferably 10 nm±20 percent.

The optical glass constituting the core part of the press-molding glass material of the present invention will be described next.

Since the press-molding glass material of the present invention has a silicon oxide film with poor reactivity with readily reduced components, the core part is desirably comprised of an optical glass containing at least one readily reduced component selected from the group consisting of W, Ti, Bi, and Nb. When the total content thereof is equal to or greater than 5 mole percent (for example, 10 to 65 mole percent, preferably 15 to 55 mole percent), application of the present invention is particularly effective. Examples of optical glasses that contain the above readily reduced components, that readily react with carbon-based thin films, and for which fusion with the molds is difficult to prevent with carbon-based thin films in particular are phosphate-based optical glasses and optical glasses containing essential components in the form of $B_2O_3$, $La_2O_3$, and ZnO. Accordingly, it is particularly desirable to employ these glasses as the core parts of the press-molding glass material in the present invention. Optical glasses I and II are examples of such optical glasses.

<Optical Glass I>

An optical glass comprised of, denoted as mole percentages: 10 to 45 percent of $P_2O_5$, 3 to 35 percent of $Nb_2O_5$, 0 to 35 percent of $Li_2O$, 0 to 25 percent of $TiO_2$, 0 to 20 percent of $WO_3$, 0 to 40 percent of $Bi_2O_3$, 0 to 20 percent of $B_2O_3$, 0 to 25 percent of BaO, 0 to 25 percent of ZnO, 0 to 50 percent of $Na_2O$, 0 to 20 percent of $K_2O$, 0 to 15 percent of $Al_2O_3$, 0 to 15 percent of $SiO_2$ (where the total quantity of $WO_3$, $TiO_2$, $Bi_2O$, and $Nb_2O_5$ is equal to or greater than 10 percent but less than 65 percent) and 0 to 10 percent of F relative to the total quantity of oxygen.

<Optical Glass II>

An optical glass comprised of, denoted as mole percentages: 0 to 50 percent of $SiO_2$, 5 to 70 percent of $B_2O_3$, 0 to 20 percent of $Li_2O$, 0 to 10 percent of $Na_2O$, 0 to 10 percent of $K_2O$, 1 to 50 percent of ZnO, 0 to 10 percent of CaO, 0 to 10 percent of BaO, 0 to 10 percent of SrO, 0 to 10 percent of MgO, 5 to 30 percent of $La_2O_3$, 0 to 22 percent of $Gd_2O_3$, 0 to 10 percent of $Yb_2O_3$, 0 to 15 percent of $Nb_2O_5$, 0 to 20 percent of $WO_3$, 0 to 40 percent of $TiO_2$, 0 to 20 percent of $Bi_2O_3$, 0 to 15 percent of $ZrO_2$, 0 to 20 percent of $Ta_2O_5$, 0 to 10 percent of $GeO_2$, and 0 to 10 percent of F relative to the total quantity of oxygen.

Optical glasses I and II will be described in greater detail. The glass compositions given below, unless specifically stated otherwise, are expressed in moles.

Optical Glass I $P_2O_5$ is a component that forms the glass network structure and imparts stability to the glass that makes manufacturing possible. When the content of $P_2O_5$ exceeds 45 mole percent, weatherability deteriorates and it tends to become difficult to maintain a high refractive index. At less than 10 mole percent, the tendency of the glass to devitrify becomes strong and the glass tends to destabilize. Thus, a range of 10 to 45 mole percent is desirable and a range of 15 to 35 mole percent is preferred.

$Nb_2O_5$ is a component that imparts characteristics such as a high refractive index and high dispersion. When incorporated in a quantity exceeding 35 percent, the glass transition temperature and yield point rise, stability and the high temperature melting property deteriorate, and bubbling and discoloration tend to occur during precision pressing. When incorporated in a quantity of less than 3 percent, the durability of the glass deteriorates and it becomes difficult to obtain the desired high refractive index. Thus, a range of 3 to 35 percent is desirable and a range of 5 to 25 percent is preferred.

$Li_2O$ is an effective component for lowering the glass transition temperature, and tends to lower the refractive index less than other alkalis. At greater than 35 percent, the stability of the glass deteriorates and devitrification tends to occur. Thus, the quantity incorporated desirably falls within a range of 0 to 35 percent. When incorporated in a quantity of less than 2 percent, the glass transition temperature of the glass obtained tends to rise. Thus, the quantity incorporated is desirably 2 to 35 percent, preferably 2 to 30 percent, and more preferably, 3 to 25 percent.

$TiO_2$ is a component that imparts a high refractive index and high dispersion to the glass, and tends to increase stability with respect to devitrification. When incorporated in a quantity exceeding 25 percent, the devitrification stability and transmittance of the glass tend to deteriorate, the yield point and liquidus temperature rise, and the glass tends to develop color during precision press molding. Thus, the quantity incorporated is desirably 0 to 25 percent, preferably 0 to 15 percent.

$WO_3$ is an effective component in terms of imparting a high refractive index, high dispersion characteristic, and low temperature softening property. $WO_3$ serves to lower the glass transition temperature and yield point and raise the refractive index. The excessive incorporation of $WO_3$—the incorporation of a quantity exceeding 20 percent, for example—tends to discolor the glass and lower the high temperature viscosity of the glass, rendering hot molding of the glass material difficult. Accordingly, the quantity incorporated is desirably 0 to 20 percent, preferably falling within a range of 0 to 15 percent, and more preferably, falling within a range of 0 to 10 percent.

To inhibit the tendency of glasses with high refractive indexes to crystallize, $WO_3$ is desirably incorporated in a quantity of equal to or greater than 1 mole percent. For example, the incorporation of equal to or greater than 2 mole percent, desirably 2 to 10 mole percent, is advantageous.

$Bi_2O_3$ is a substitute material for lead and a component that imparts a high refractive index and high dispersion. It has the effects of greatly increasing the glass production range and stabilizing the glass. Accordingly, the introduction of $Bi_2O_3$ makes it possible to vitrify even glasses with low $P_2O_5$ contents. When incorporated in a quantity exceeding 40 percent, the glass tends to discolor. Thus, the $Bi_2O_3$ content is desirably 0 to 40 percent, preferably 0 to 25 percent.

$B_2O_3$ is effective at enhancing the melt properties of the glass and homogenizing the glass. At the same time, the introduction of a small quantity changes the bonding properties of the OH present within the glass, producing the effect of inhibiting bubbling of the glass during precision press molding. When $B_2O_3$ is incorporated in a quantity exceeding 20 percent, the weatherability of the glass deteriorates and the glass tends to become unstable. Thus, the quantity incorporated is desirably kept to 0 to 20 percent, preferably within a range of 0 to 10 percent.

BaO is a component that has the effects of imparting a high refractive index, enhancing devitrification stability, and lowering the liquidus temperature. When $WO_3$ is incorporated (particularly when a large quantity of $WO_3$ is incorporated), the incorporation of BaO inhibits discoloration and has the effect of greatly raising devitrification stability. When the $P_2O_5$ content is low, it also has the effect of increasing the weatherability of the glass. When BaO is incorporated in a quantity exceeding 25 percent, the glass becomes unstable and the glass transition temperature and yield point rise. Thus, the quantity of BaO incorporated is desirably 0 to 25 percent, preferably 0 to 15 percent.

ZnO is a component that can be incorporated to raise the refractive index and increase dispersion of the glass. The incorporation of a small quantity of ZnO has the effect of lowering the glass transition temperature, yield point, and liquidus temperature. However, the incorporation of an excessive quantity may run the risk of producing marked deterioration in the devitrification stability of the glass and raising the liquidus temperature. Accordingly, ZnO is desirably incorporated in a quantity of 0 to 25 percent, preferably 0 to 15 percent, and more preferably, 0 to 10 percent.

$Na_2O$ and $K_2O$ are both components that can be incorporated to raise the resistance to devitrification of the glass, lower the glass transition temperature, yield point, and liquidus temperature, and improve the melt properties of the glass. However, when $Na_2O$ exceeds 50 percent, $K_2O$ exceeds 20 percent, or the combined quantity of $Li_2O$, $Na_2O$, and $K_2O$ exceeds 55 percent, not only does the stability of the glass deteriorate, but there may be a risk of deterioration of the weatherability and durability of the glass. Accordingly, $Na_2O$ and $K_2O$ are desirably incorporated in quantities of 0 to 50 percent and 0 to 20 percent respectively, and the combined quantity of $Li_2O$, $Na_2O$, and $K_2O$ is desirably 0 to 55 percent. The preferred ranges are 3 to 35 percent for $Na_2O$ and 0 to 10 percent for $K_2O$.

$Al_2O_3$ and $SiO_2$ are components that can be incorporated to adjust the stability and optical constants of the glass. However, these components raise the glass transition temperature and thus may present the risk of compromising precision press moldability. Thus, each is desirably kept to equal to or less than 15 percent, preferably 0 to 10 percent.

MgO, CaO, and SrO are components that can be incorporated to adjust the stability and weatherability of the glass. However, when incorporated in excessive quantity, the glass becomes unstable. Thus, the quantity of each that is incorporated is desirably kept to 0 to 15 percent, preferably 0 to 10 percent.

$La_2O_3$, $Gd_2O_3$, $Yb_2O_3$, $ZrO_2$, and $Ta_2O_3$ are all components that can be incorporated to adjust the stability and optical constants of the glass. However, all of these components raise the glass transition temperature, and thus may present the risk of compromising precision press moldability. Accordingly, the quantity of each that is incorporated is desirably kept to 0 to 10 percent, preferably 0 to 8 percent.

To improve the above properties while achieving the object of the present invention, the total quantity of the above components combined with clarifying agents desirably exceeds 95 percent, preferably exceeds 98 percent, more preferably exceeds 99 percent, and is optimally 100 percent.

In addition to the above components, clarifying agents can be added in a ratio relative to the combined total of the other components of 0 to 1 mass percent. However, the addition of an excessive quantity of clarifying agents runs the risk of damaging the molding surfaces of the molds during precision press molding, particularly the mold release film, and caution is required. $Sb_2O_3$, $SnO_2$, $CeO_2$, and $As_2O_3$ are examples of clarifying agents. In consideration of its impact on the environment, $As_2O_3$ is to be avoided. $Sb_2O_3$ is desirably employed in a quantity of 0 to 1 mass percent. $Sb_2O_3$ is effective as a glass clarifying agent. However, when more than 1 mass percent is added, the glass tends to develop bubbles during press molding. Thus, it is desirable to keep the quantity incorporated to 0 to 1 mass percent. $SnO_2$ and $CeO_2$ can be simultaneously employed; the combined quantity employed is desirably kept to 0 to 2.5 mass percent.

Additionally, PbO is desirably not incorporated due to its impact on the environment. Except when discoloring the glass to impart a light-absorbing function over a specific wavelength range, Cu, Fe, Cd, and the like are desirably not incorporated.

F is a component that is effective for lowering the Tg. However, the incorporation of an excessive quantity causes volatization from the melt when molding a glass melt, resulting in striae and variation in constants. Thus, the quantity incorporated is desirably kept to 0 to 10 mole percent of the total quantity of oxygen, and preferably limited to 0 to 5 mole percent.

Optical glass I, which serves as the above core part, has a refractive index nd of equal to or higher than 1.7 and an Abbé number vd of equal to or lower than 35, preferably equal to or lower than 30, and more preferably, equal to or lower than 25, making it possible to achieve a high refractive index and high dispersion. This makes it an extremely important, high value added glass. However, the components (W, Ti, Bi, and Nb) that are incorporated to achieve such useful optical constants readily reduce and have high reactivity in the press molding process. That is, at the interface of the glass surface and the molding surfaces of the molds, these components tend to react at elevated temperatures. As a result, reaction traces such as clouding and scratches on the surface of the molded article obtained, and fusion to the molding surfaces, tend to occur. Thus, an optical element of inadequate external appearance tends to result. By contrast, in the present invention, by forming a silicon oxide film on the surface thereof, it is possible to prevent the reaction between the optical glass constituting the core part and the molding surfaces of the molds. Further, the press-molding glass material of the present invention, in which the surface free energy as measured by the three-liquid method is lowered to 75 $mJ/m^2$ or below by forming the silicon oxide film, tends not to fuse to the molding surfaces of the molds, making it possible to manufacture optical elements at high yield by precision press molding. When the glass transition temperature Tg of optical glass I is equal to or higher than 430° C.—for example, equal to or higher than 450° C. and equal to or lower than 520° C.—the effect of the present invention is pronounced. The effect of the present invention is also pronounced when the softening point is equal to or higher than 530° C., for example, equal to or higher than 540° C. and equal to or lower than 600° C.

Optical Glass II

In optical glass II, $B_2O_3$ is an essential component for the glass network structure. $La_2O_3$ is an essential component for imparting a high refractive index and low dispersion characteristic. When both components are present, the stability of the glass is further enhanced. ZnO is an essential component for imparting a low temperature softening property to the glass without lowering the refractive index. By incorporating these essential components, optical glass II can achieve optical characteristics in the form of a refractive index (nd) exceeding 1.7, desirably equal to or higher than 1.8, and an Abbé number (vd) of equal to or higher than 27, desirably 35 to 50.

The composition of optical glass II will be described below.

$SiO_2$ serves to enhance the stability of the glass, but when incorporated in excessive quantity, lowers the refractive index and raises the glass transition temperature. Accordingly, the quantity incorporated is kept to 0 to 50 percent. The quantity incorporated is desirably 0 to 40 percent, preferably 1 to 20 percent, and more preferably, 4 to 15 percent.

$B_2O_3$ is an essential component for network formation, but lowers the refractive index (nd) when incorporated in excessive quantity. It is thus desirably incorporated in a quantity of 5 to 70 percent, preferably 10 to 65 percent, and more preferably, 20 to 55 percent.

$Li_2O$ has the effect of greatly lowering the glass transition temperature, but lowers the refractive index and reduces the stability of the glass when incorporated in excessive quantity. Accordingly, the quantity of $Li_2O$ is desirably 0 to 20 percent, preferably 0 to 15 percent. It does not have to be incorporated. $Na_2O$ and $K_2O$ work to enhance melt properties, but lower the refractive index and glass stability when incorporated in excessive quantities. Thus, they are each incorporated in a quantity of 0 to 10 percent, desirably 0 to 8 percent, and preferably, 0 to 6 percent. They do not have to be incorporated.

ZnO is an essential component that imparts a low temperature softening property while maintaining a high refractive index, but diminishes the stability of the glass when incorporated in excessive quantity. Thus, the quantity incorporated is desirably 1 to 50 percent, preferably 3 to 45 percent, and more preferably, 10 to 40 percent.

CaO, BaO, SrO, and MgO also work to enhance the melt properties, but lower the refractive index and glass stability when incorporated in excessive quantities. Thus, they are each desirably incorporated in a quantity of 0 to 10 percent, preferably 0 to 8 percent, and more preferably, 0 to 5 percent. BaO serves to raise the refractive index, but reduces the stability of the glass when incorporated in excessive quantity. Thus, the quantity incorporated is desirably 0 to 10 percent, preferably 0 to 8 percent, and more preferably, 0 to 5 percent.

$La_2O_5$ is an essential component that imparts a high refractive index and a low dispersion characteristic, but lowers the stability of the glass when incorporated in excessive quantity. It is thus desirably incorporated in a quantity of 5 to 30 percent, preferably 7 to 25 percent, and more preferably, 9 to 18 percent.

$Gd_2O_3$ is a component that imparts a high refractive index and a low dispersion characteristic, but lowers the stability of the glass when incorporated in excessive quantity. It is thus desirably incorporated in a quantity of 0 to 22 percent. When $Gd_2O_3$ is incorporated in combination with $La_2O_3$, a greater glass stabilizing effect can be achieved than when it is incorporated alone. The quantity incorporated is desirably 0 to 20 percent, particularly preferably 1 to 20 percent.

$Yb_2O_3$ is an optional component that is used to raise the refractive index and reduce dispersion. The incorporation of a small quantity increases the stability and chemical durability of the glass. However, the incorporation of an excessive quantity greatly compromises the stability of the glass in terms of devitrification, and raises the glass transition temperature and yield point temperature. Thus, the content is desirably 0 to 10 percent, preferably 0 to 8 percent.

$Nb_2O_5$ is also a component that raises the refractive index. However, when incorporated in excessive quantity, it lowers the stability of the glass and raises the liquidus temperature. Thus, it is desirably incorporated in a quantity of 0 to 15 percent, preferably 0 to 13 percent, and more preferably, 0 to 7 percent.

$WO_3$ serves to raise the refractive index and enhance the stability of the glass. However, it lowers the stability of the glass and causes discoloration of the glass when incorporated in excessive quantity. Accordingly, $WO_3$ is desirably incorporated in a quantity of 0 to 20 percent, preferably 0 to 18 percent, and more preferably, 1 to 13 percent.

$TiO_2$ is also a component that raises the refractive index. However, it lowers the stability of the glass and discolors the glass when incorporated in excessive quantity. It is thus desirably incorporated in a quantity of 0 to 40 percent, preferably 0 to 35 percent, and more preferably, 0 to 24 percent.

To raise the refractive index, the combined quantity of $WO_3$, $Ta_2O_5$, $Nb_2O_5$, and $TiO_2$ is desirably 0.1 to 25 percent, preferably 1 to 21 percent, and more preferably, 3 to 15 percent.

To achieve an even higher refractive index while satisfying the various conditions required of a glass with an Abbé number (vd) in a range of less than 27, the molar ratio of the quantity of $B_2O_3$ to the combined quantity of $B_2O_3$ and $SiO_2$, ($B_2O_3/(B_2O_3+SiO_2)$), is desirably kept to 0.50 to 1.00, preferably to 0.60 to 0.95.

$Bi_2O_3$ serves to raise the refractive index and enhance the stability of the glass. However, it discolors the glass and presents problems such as corrosion of melting furnaces made of platinum when incorporated in excessive quantity. Thus, it is desirably incorporated in a quantity of 0 to 20 percent, preferably 0 to 10 percent, and more preferably, 0 to 5 percent.

$ZrO_2$ serves to raise the refractive index, but reduces the stability of the glass and lowers the liquidus temperature when incorporated in excessive quantity. Thus, the quantity incorporated is desirably 0 to 15 percent, preferably 0 to 12 percent, and more preferably, 1 to 6 percent.

To raise the refractive index while maintaining stability of the glass, the combined quantity of $WO_3$, $Ta_2O_5$, $Nb_2O_5$, $TiO_2$, and $ZrO_2$ is desirably 2 to 40 mole percent, preferably 5 to 35 mole percent.

$Ta_2O_5$ is an optional component used to raise the refractive index and reduce dispersion. The incorporation of a small quantity of $Ta_2O_5$ has the effects of improving high temperature viscosity and devitrification stability without lowering the refractive index of the glass. However, when incorporated in a quantity exceeding 20 percent, the liquidus temperature rises sharply and dispersion increases. Thus, the quantity incorporated is desirably 0 to 20 percent, preferably 0 to 17 percent.

$GeO_2$ is an optional component that serves to raise the refractive index of the glass and enhance the stability of the glass. It is desirably incorporated in a quantity of 0 to 10 percent, preferably 0 to 8 percent. However, it is considerably more expensive than other components, and is thus preferably not incorporated at all.

To improve the above properties while achieving the object of the present invention, the combined quantity of the various above components together with clarifying agents desirably exceeds 95 percent, preferably exceeds 98 percent, more preferably exceeds 99 percent, and is optimally 100 percent.

In addition to the above components, clarifying agents can be added in a ratio relative to the combined total of the other components of 0 to 1 mass percent. However, the addition of an excessive quantity of clarifying agent may run the risk of damaging the molding surfaces of the molds during precision press molding, particularly the mold release film, and caution is required. $Sb_2O_3$, $SnO_2$, $CeO_2$, and $As_2O_3$ are examples of clarifying agents. In consideration of its impact on the environment, $As_2O_3$ is to be avoided. $Sb_2O_3$ is desirably employed in a quantity of 0 to 1 mass percent. $SnO_2$ and $CeO_2$ can be simultaneously employed; the combined quantity employed is desirably kept to 0 to 2.5 mass percent.

F is a component that is effective for lowering the Tg. However, the incorporation of an excessive quantity causes volatization from the melt when molding a glass melt, resulting in striae and variation in constants. Thus, the quantity incorporated is desirably kept to 0 to 10 mole percent of the total quantity of oxygen, and preferably limited to 0 to 5 mole percent.

Additionally, PbO is desirably not incorporated due to its impact on the environment and because it reduces during precision press molding in a non-oxidizing atmosphere, adhering to the molding surfaces of the pressing mold. Excluding cases of discoloring the glass to impart a light-absorbing function over a specific wavelength range, Cu, Fe, Cd, Ni, Cr, and the like are desirably not incorporated.

Optical glass I, which serves as the above core part, has a refractive index nd of equal to or higher than 1.7 and an Abbé number νd of equal to or lower than 35, preferably equal to or lower than 30, and more preferably, equal to or lower than 25, making it possible to achieve a high refractive index and high dispersion. This makes it an extremely important, high value added glass. Optical glass II is capable of achieving a high refractive index and low dispersion in the form of a high refractive index nd exceeding 1.7, desirably equal to or higher than 1.8, and an Abbé number νd of equal to or higher than 27, desirably 35 to 50. Thus, in the same manner as optical glass I, it is an extremely important, high value added glass. However, the components (W, Ti, Bi, and Nb) that are incorporated to achieve such useful optical constants readily reduce and have high reactivity in the press molding process. That is, at the interface of the glass surface and the molding surfaces of the molds, these components tend to react at elevated temperatures. As a result, reaction traces such as clouding and scratches on the surface of the molded article obtained, and fusion to the molding surfaces, tend to occur. Thus, an optical element of inadequate external appearance tends to result.

By contrast, in the present invention, by forming the silicon oxide film on the surface thereof, it is possible to prevent the reaction between the optical glass constituting the core part and the molding surfaces of the molds. Further, the press-molding glass material of the present invention, in which the surface free energy as measured by the three-liquid method is lowered to 75 mJ/m$^2$ or below by forming the silicon oxide film, tends not to fuse to the molding surfaces of the molds, making it possible to manufacture optical elements at high yield by precision press molding. When the glass transition temperature Tg of optical glass I is equal to or higher than 430° C.—for example, equal to or higher than 450° C. and equal to or lower than 520° C.—the effect of the present invention is pronounced. The effect of the present invention is also pronounced when the softening point is equal to or higher than 530° C., for example, equal to or higher than 540° C. and equal to or lower than 600° C. When the glass transition temperature Tg of optical glass II is equal to or higher than 530° C.—for example, equal to or higher than 560° C. and equal to or lower than 630° C.—the effect of the present invention is pronounced. The effect of the present invention is also pronounced when the softening point is equal to or higher than 640° C., such as equal to or higher than 650° C. and equal to or lower than 720° C.

The shape of the core part constituting the press-molding glass material of the present invention is essentially identical to the shape of the press-molding glass material of the present invention because the thickness of the silicon oxide film covering the portion to be an optically functional surface of the core part is normally about several tens of nm.

The press-molding glass material of the present invention desirably has a shape similar to that of the glass molded article (glass molded article molded by press molding) having a surface shape and center thickness identical to the targeted glass optical element. By press molding a glass material with a shape similar to that of the glass molded article obtained by press molding (also referred to as a "similarly shaped glass material", hereinafter), the rate of change in the shape of the glass material during press molding decreases, and as a result, the amount of elongation of the silicon oxide film decreases, making it possible to prevent excessive thinning of the silicon oxide film and the formation of cracks resulting in loss of function of the silicon oxide film.

A "shape similar to that of the glass molded article" means that the rate of change in the center thickness due to press molding to obtain a glass optical element is equal to or less than 50 percent, and the rate of change in the outer diameter is equal to or less than 50 percent. When employing a similarly shaped glass material in which the rate of change of the center thickness due to press molding is equal to or less than 50 percent and the rate of change in the outer diameter is equal to or less than 50 percent, it becomes possible to readily manufacture an optical element affording high quality optical performance without generating surface cracks, clouding, scratches, or the like.

In this context, the rate of change is a ratio indicating how much the dimension after press molding differs from the dimension prior to press molding, that can be calculated from the following equation (equation A).

[Numeral 2]

$$\text{Rate of change}(\%) = |1 - (\text{dimension after press molding/dimension before press molding})| \times 100 \quad \text{(Equation A)}$$

That is, the rate of change in center thickness can be calculated from equation B below:

[Numeral 3]

$$\text{Rate of change in center thickness}(\%) = |1 - (\text{center thickness of press molded article/center thickness of glass material})| \times 100 \quad \text{(Equation B)}$$

For example, when the center thickness of the glass material before press molding is 2.0 mm and the center thickness of the press molded article after pressing is 1.0 mm, equation B gives a rate of change in center thickness of 50 percent.

The rate of change in outer diameter can be calculated from equation C below.

[Numeral 4]

Rate of change in outer diameter(%)=|1−(outer diameter of press molded article/outer diameter of glass material)|×100   (Equation C)

For example, when the outer diameter of the glass material before press molding is 10.0 mm and the outer diameter of the press molded article after pressing is 15.0 mm, equation C gives a rate of change in outer diameter of 50 percent.

By keeping the rate of change in center thickness to equal to or less than 50 percent and the rate of change in outer diameter to equal to or less than 50 percent in the course of press molding a similarly shaped glass material, the small amount of deformation of the glass material is accompanied by a small amount of deformation of the silicon oxide film, making it possible to prevent cracks in the silicon oxide film.

The rate of change in center thickness is desirably equal to or less than 30 percent, preferably equal to or less than 20 percent. However, when the rate of change in center thickness is less than 1 percent, there are cases where gas pockets develop between the main surface of the similarly shaped glass material and a molding surface of the mold, compromising the surface precision of the press molded article. Accordingly, the rate of change in center thickness is desirably equal to or more than 1 percent, preferably equal to or more than 5 percent.

The rate of change in outer diameter is desirably equal to or less than 30 percent, preferably equal to or less than 20 percent, and more preferably, equal to or less than 10 percent. However, when the rate of change in outer diameter is less than 1 percent, there are cases where gas pockets develop between the main surface of the similarly shaped glass material and a molding surface of the mold, compromising the surface precision of the press molded article. Accordingly, the rate of change in outer diameter is desirably equal to or more than 1 percent, preferably equal to or more than 3 percent.

FIG. 1 is a sectional view illustrating an embodiment of the press-molding glass material according to the present invention. The glass material is a similarly shaped glass material that has been preformed into a shape similar to that of the glass molded article serving as a base for obtaining the final optical element. In FIG. 1, the letter d denotes the outer shape dimension of the glass material and the letter t denotes the center thickness. The glass material is comprised of a core part 1, desirably comprised of a multicomponent optical glass such as optical glass I or II, and a silicon oxide film 2, coated on the outer surface of core part 1.

Figure 2:
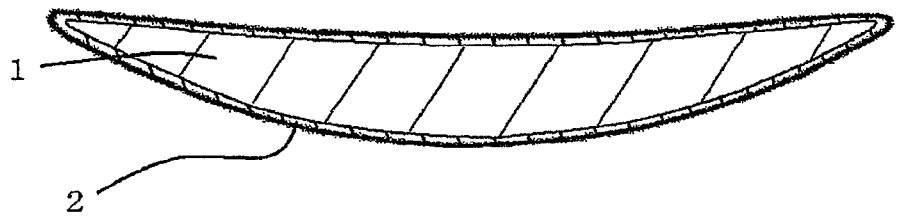
FIG. 2 is a sectional view of a glass molded article obtained by press molding the press-molding glass material shown in FIG. 1.

FIG. 2 is a sectional view of a glass molded article obtained by press molding the glass material shown in FIG. 1. Press molding has rendered center thickness t thinner than it is in the glass material, and has rendered outer diameter dimension d greater than it is in the glass material. Silicon oxide film 2 is formed over the entire surface of the press molded article. The glass molded article shown in FIG. 2 can be made into the glass optical element shown in FIG. 3 by centering and edging (grinding) the outer circumference portion. Silicon oxide film 2 is also removed from the outer circumference edge surface that is ground during centering and edging.

The preforming of core part of the press-molding glass material of the present invention will be described next.

The press-molding glass material of the present invention can be manufactured using a piece of glass serving as core part 1 that has been preformed into a prescribed volume and prescribed shape. This preforming can be conducted, for example, by cutting a piece out of a block of optical glass and grinding and polishing it to preform it to a prescribed volume and shape.

Alternatively, molten optical glass can be dripped from a pipe, or separated while flowing, into glass gobs of prescribed weight and the glass gobs can be preformed while they are cooling. Here, the method of supporting molten glass in a receiving mold in which gas is being blown up through the bottom, and preforming the molten glass while cooling it in a state where it is essentially floating can be employed. This method is desirable because it affords high productivity and yields a glass material with a smooth surface. In particular, when preforming the core part of a glass material with a shape similar to that of the targeted glass optical element or glass molded article, the glass melt on the receiving mold can be pressed from above by a metal mold of prescribed shape to deform the glass from the upper surface side and the glass can be cooled to mold a core part of the similarly shaped glass material. For example, when molding a core part of a glass material such as that shown in FIG. 1, the glass melt on the receiving mold can be pressed with a metal mold having a convex surface to deform the upper surface of the glass into a concave shape and the glass can be cooled to obtain a core part of a similarly shaped glass material having convex and concave surfaces.

In the press-molding glass material of the present invention, the surface of a preformed article comprised of optical glass in the form of a core part 1 that has been preformed as set forth above is coated with a silicon oxide film 2. A known film-forming method such as sputtering or vacuum deposition can be employed as the coating method. The surface free energy as measured by the three-liquid method of the press-molding glass material of the present invention can be controlled through the film-forming conditions. The details are set forth further below.

[Method of Manufacturing Press-Molding Glass Material]

The method of manufacturing a press-molding glass material of the present invention is a method of manufacturing a press-molding glass material that has a core part comprised of optical glass and a silicon oxide film covering at least a portion to be an optically functional surface of the core part. A film-forming material comprised of $SiO_2$ is employed and film forming is conducted in an atmosphere with an oxygen content of equal to or higher than 5 volume percent but less than 20 volume percent, in the form of a mixed gas of an inert gas and oxygen, to form the silicon oxide film. The press-molding glass material, on the surface of which is formed a silicon oxide film formed in an atmosphere containing equal to or higher than 5 volume percent but less than 20 volume percent of oxygen using a film-forming material comprised of $SiO_2$, can improve the yield during press molding. As set forth above, it is thought that since the silicon oxide film formed under the above film-forming conditions contains more oxygen than a silicon carbide film formed by a conventional film-forming method, the surface free energy as measured by the three-liquid method is lower than that of conventional press-molding glass materials having silicon oxide films. That is, the press-molding glass material that is manufactured by the method of manufacturing a press-molding glass material of the present invention can be the above-described press-molding glass material of the present invention having a surface free energy as measured by the three-liquid method of equal to or lower than 75 $mJ/m^2$. However, for the reasons given above, the thickness of the silicon oxide film is less than 15 nm.

In the method of manufacturing a press-molding glass material of the present invention, the process of forming the silicon oxide film is conducted in an atmosphere containing equal to or higher than 5 volume percent but less than 20 volume percent of oxygen in an inert gas such as argon. When the content of oxygen in the atmosphere in which film formation is conducted is less than 5 volume percent or when it is equal to or greater than 20 volume percent, it is difficult to inhibit fusing of the press-molding glass material to the molds in the course of press molding using the press-molding glass material obtained. This is thought to be because when the oxygen content is less than 5 volume percent, the surface free energy as measured by the three-liquid method is high because the oxygen content of the silicon oxide film that is formed is low. When the oxygen content is equal to or greater than 20 volume percent, the higher order structure within the surface of the press-molding glass material destabilizes and reactions are activated, which is thought to increase the surface free energy as measured by the three-liquid method. From the perspective of more effectively inhibiting fusion, the oxygen content is desirably equal to or higher than 5 volume percent and equal to or lower than 15 volume percent. Examples of the inert gas that constitutes the component other than oxygen in the atmosphere are: argon gas, helium gas, neon gas, and xenon gas.

The film is desirably formed by sputtering, preferably by PVD, using a film-forming material comprised of $SiO_2$. Specifically, a silicon oxide film can be formed on the core part by the PVD method using $SiO_2$ (such as quartz glass) as the target base material and a sputtering gas in the form of an inert gas containing equal to or higher than 5 volume percent but less than 20 volume percent of oxygen. More specifically, the following method can be employed to form a silicon oxide film. That is, multiple glass cores (core parts) that have been formed into a prescribed shape are arranged on a tray, the tray is placed in a vacuum chamber, and while drawing a vacuum in the vacuum chamber, the glass cores are heated to about 300° C. with a heater. After evacuating the interior of the chamber to a degree of vacuum of equal to or lower than $1 \times 10^{-5}$ Torr, a sputtering gas in the form of an inert gas containing equal to or higher than 5 volume percent but less than 20 volume percent of oxygen is introduced, a high frequency is applied to the target base material (quartz class) in the vacuum chamber, the starting materials are converted to plasma, and a silicon oxide film is formed on the surface of the glass cores. It is desirable to employ an output during film formation of 100 to 300 W, a sputtering gas flow rate of 20 to 100 sccm, and an atmospheric temperature during film formation of 350 to 370° C. The thickness of the silicon oxide film can be kept to within a desired range by adjusting the pressure (degree of vacuum) within the vacuum chamber, the output (power of the power source), and film formation period. As stated above, it suffices for the silicon oxide film that is formed to cover at least the portion of the core part that will be the optically functional surface of the optical element once the optical element has been molded by press molding the press-molding glass material that has been obtained.

In the method of manufacturing a press-molding glass material of the present invention, a film-forming material comprised of $SiO_2$ is employed. In this context, the term "film-forming material comprised of $SiO_2$" means a material into which components other than $SiO_2$ are not intentionally mixed. It is permissible for impurities that have been mixed in during the $SiO_2$ preparation process to be contained. The degree of purity of the $SiO_2$ is desirably equal to or higher than 95 mass percent, preferably equal to or higher than 98 weight percent, and more preferably, equal to or higher than 99 weight percent.

[Method of Manufacturing Optical Element]

The method of manufacturing an optical element of the present invention comprises heating and precision press molding with a pressing mold the press-molding glass material of the present invention, or a press-molding glass material manufactured by the manufacturing method of the present invention.

The precision press molding method, also called the mold optics pressing method, is well known in the field of art to which the present invention belongs. A surface through which light passes or by which light is refracted, diffracted, or reflected in the optical element is called an optically functional surface. For example, taking the example of a lens, lens surfaces such as the aspherical surface of an aspherical lens and the spherical surface of a spherical lens correspond to optically functional surfaces. In precision press molding, the molding surfaces of the pressing mold are precisely transferred to the glass to form optically functional surfaces. That is, no mechanical processing such as grinding or polishing is necessary to finish the optically functional surfaces.

The pressing mold employed in precision press molding can have adequate heat resistance and rigidity, and can be precisely machined out of a dense material. Examples are pressing molds of silicon carbide, silicon nitride, tungsten carbide, aluminum oxide, titanium carbide, and metals such as stainless steel, and pressing molds of such materials with surfaces coated with heat-resistant metals, noble metal alloys, carbides, nitrides, borides, or the like.

A mold having a coating such as a carbon-containing film on molding surfaces that come into contact with the press-molding glass material can be employed. The carbon-containing film that is amorphous and/or crystalline, comprised of graphite and/or diamond, in the form of a single component layer or compound layers, is desirably employed. The carbon film can be formed by a method such as sputtering, plasma CVD, CVD, or ion plating. For example, a film can be formed by sputtering using graphite as the sputtering target in a sputtering gas in the form of an inert gas such as Ar. Alternatively, the film can be formed by the microwave plasma CVD method using starting material gases in the form of methane gas and hydrogen gas. When forming the film by the ion plating method, ionization can be conducted using benzene gas. The carbon film can contain C—H bonds. Providing a carbon-containing film on the molding surface of a mold makes it possible to further prevent fusion of the press-molding glass material to the mold during press molding. However, in such cases, it is desirable to conduct pressing in a non-oxidizing atmosphere to prevent oxidation of the carbon during press molding. However, in a non-oxidizing atmosphere, reduction tends to occur due to the above readily reduced components, and there is a problem in that interface reactions tend to occur between the glass and carbon. By contrast, in the above-described press-molding glass material having the silicon oxide film, the glass in the core part does not directly come into contact with the carbon-containing film on the molding surface during press molding. An advantage is thus afforded in that even when pressing is conducted in a non-oxidizing atmosphere such as nitrogen gas, it is possible to inhibit the interface reaction between the glass and carbon.

As a specific example, precision press molding can be conducted by the following method.

Figure 4:
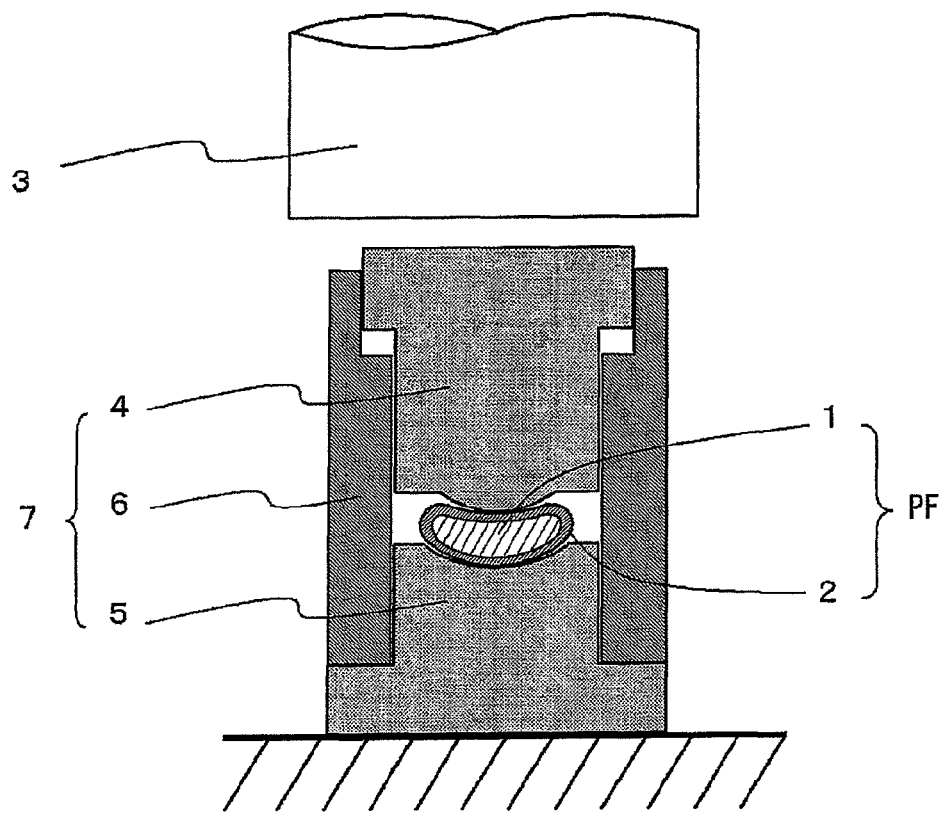
FIG. 4 is a descriptive drawing of an embodiment of the precision press molding method.

In press molding, as shown in FIG. 4, a press-molding glass material PF is fed into a mold comprised of an upper mold 4, a lower mold 5, and a sleeve mold 6, and the temperature is raised to a region suited to pressing. For example, the heating temperature can be suitably established based on the type of optical glass of core part 1. It is desirable to conduct press molding when the press-molding glass material PF and mold 7 are in a temperature region where the viscosity of the press-molding glass material PF is $10^5$ to $10^{10}$ dPa·s. The pressing temperature is desirably a temperature that, for example, corresponds to a viscosity of the optical glass constituting core part 1 of about $10^{7.2}$ dPa·s. Specifying that the temperature corresponding to a viscosity in core part 1 of $10^{7.2}$ dPa·s be equal to or lower than 800° C., desirably equal to or lower than 750° C., and preferably, equal to or lower than 650° C. can serve as an index for selecting the glass. Press molding can be conducted by applying a prescribed load that causes the pressing head 3 to descend.

Press molding can be conducted by introducing press-molding glass material PF into mold 7, and jointly heating the press-molding glass material PF and mold 7 to the press molding temperature. Press molding can also be conducted by introducing a heated press-molding glass material PF into a preheated mold 7. In the former method, the press-molding glass material remains in contact with the pressing mold for a longer period than in the latter method, tending to result in fusion. However, according to the present invention, precision press molding can be conducted without fusion even when the above method is employed. Additionally, when employing the latter method, it is possible to heat the press-molding glass material PF to a temperature corresponding to a viscosity of $10^5$ to $10^9$ dPa·s and to heat mold 7 to a temperature corresponding to a glass viscosity of $10^9$ to $10^{12}$ dPa·s, place press-molding glass material PF in mold 7, and immediately conduct the press molding. This method is desirable in that since the degree of the temperature change in the mold can be kept relatively small, the cycle time for raising and lowering the temperature in the molding device can be shortened, and an effect of inhibiting the thermal deterioration of mold 7 can be achieved. In all of these cases, a suitable load application schedule for starting press molding, or for starting cooling once press molding has begun, is applied, and while maintaining tight contact between the molding surface and the glass element, the temperature is lowered. Subsequently, the mold is released and the molded article is removed. The mold release temperature is desirably a temperature corresponding to a glass viscosity of $10^{12.5}$ to $10^{13.5}$ dPa·s.

A silicon oxide film is present on the surface of the molded article that has been released from the mold in the same manner as on the press-molding glass material prior to pressing. Since the silicon oxide film is present on the molded article that has been obtained by press molding, the content of silicon oxides, such as $SiO_2$, is much higher than it would be in a molded article without a silicon oxide film, imparting a characteristic of good chemical durability. The thickness of the silicon oxide film remains essentially unchanged with press molding. This tendency is pronounced when the shape of the glass molded article that is obtained by press molding is similar to that of the press-molding glass material, particularly a shape where the rate of change in the center thickness with press molding is equal to or less than 50 percent and the rate of change in the outer diameter is equal to or less than 50 percent. Compared to the glass core, the silicon oxide film has a much lower coefficient of thermal expansion and a higher glass transition temperature (tending not to undergo thermal deformation (elongation) at press molding temperatures). Thus, even when a press-molding glass material PF that is at ordinary temperature is heated to the pressing temperature, press molded, and then cooled to ordinary temperature following press molding, the thickness of the silicon oxide film will not vary greatly between the press-molding glass material and the glass optical element following press molding.

The molded article that is obtained can be shipped as the final product optical element, or an optically functional film such as an antireflective film can be formed on the surface thereof to obtain a final product. In the latter case, a single layer of a material such as $Al_2O_3$, $ZrO_2$—$TiO_2$, or $MgF_2$, or a laminate of such materials can be suitably formed on the molded article having the silicon oxide film to provide a desired antireflective film. The antireflective film can be formed by a known method such as vapor deposition, ion-assisted vapor deposition, ion plating, or sputtering. For example, in the case of vapor deposition, a vapor deposition device can be employed. In a vacuum atmosphere of about $10^{-4}$ Torr, a vapor deposition material can be heated with an electron beam, direct current flow, or an arc. The vapor of the material produced by vaporization or sublimation from the material can be delivered onto the substrate and caused to condense or precipitate to form an antireflective film. The temperature to which the substrate is heated can be from room temperature to about 400° C. However, when the glass transition temperature (Tg) of the substrate is equal to or lower than 450° C., the maximum temperature to which the substrate is heated is desirably set to Tg—50° C. The silicon oxide film that is present on the surface of the molded article obtained following press molding will be highly compatible with the antireflective film. Thus, an effect is also achieved in that the antireflective film tends not to peel off. The perimeter portion of the press molded article can be centered and edged for use as a glass optical element.

The glass optical element obtained by the present invention can be employed as a small diameter, thin, lightweight lens, such as the lenses for small image pickup systems that are mounted in portable image pickup devices; a lens for communication use; an optical pickup object lens; or a collimator lens. The shape of the lens is not specifically limited; it can be any of various shapes, such as those of a convex meniscus lens, concave meniscus lens, biconvex lens, or biconcave lens.

Examples

The present invention is described in greater detail below through Examples. However, the present invention is not limited to the embodiments shown in Examples 1. Fabrication of a Press-Molding Glass Material An optical glass belonging to the above-described optical glass I having the composition stated in Table 2 below was dripped onto receiving molds in a molten state and cooled, and glass gobs (core parts of glass material) shaped to have a convex surface on one side and a concave surface on the other side as shown in FIG. 1 were preformed.

TABLE 2

| Unit | mol % |
| --- | --- |
| $B_2O_3$ | 2.00 |
| $P_2O_5$ | 25.50 |
| $Al_2O_3$ | 0 |
| $Li_2O$ | 6.00 |
| $Na_2O$ | 10.50 |
| $K_2O$ | 2.00 |
| BaO | 1.00 |
| ZnO | 0 |
| $TiO_2$ | 7.00 |
| $Nb_2O_5$ | 18.00 |
| $WO_3$ | 8.00 |
| $Bi_2O_3$ | 20.00 |
| Ti + Nb + W + Bi | 53.00 |
| Total | 100 |

TABLE 2-continued

| Unit | mol % |
|---|---|
| Refractive index | 2.0031 |
| Abbe number | 19.1 |
| Glass transition temperature Tg (° C.) | 488 |
| Yield point Ts (° C.) | 537 |

Next, the following method was used to form a silicon oxide film on the surface of the core parts of glass material.

That is, a sputtering device equipped with a tray holding multiple core parts and an opposing chamber (sputtering chamber) housing a target base material (here, quartz glass with a purity of equal to or higher than 99 mass percent) was employed to form a silicon oxide film by sputtering. The glass material core parts positioned on the tray were first preheated to about 200° C. outside the chamber and then conveyed into the chamber. Next, the glass core parts were heated to about 300° C. with a heater while evacuating the interior of the chamber. Once a vacuum of equal to or greater than $1\times10^{-5}$ Torr had been generated within the chamber, a sputtering gas comprised of argon gas with a prescribed amount of oxygen was introduced. The high frequency output was set to 250 W and the target base material was sputtered with Ar ions. The target atom in the form of $SiO_2$ adhered to and deposited on the glass core parts. Subsequently, the interior of the chamber was cooled and the glass material after the film formation was removed together with the tray. The outer diameter dimension d of the glass material was 17.6 mm and the center thickness was 3.24 mm.

2. Measurement of Surface Free Energy

The surface free energy by the three-liquid method of the press-molding glass material fabricated in 1. above was measured by the following method.

The ultrapure water, glycerin, and diiodomethane listed in Table 1 were first separately dripped onto the press-molding glass material that had been fabricated and the various contact angles $\theta_1$, $\theta_2$, and $\theta_3$ were measured.

Next, the parameters of the various liquids listed in Table 1 and the measured contact angles were substituted into the following inverse determinant:

$$\begin{bmatrix} \gamma_s^a \\ \gamma_s^b \\ \gamma_s^c \end{bmatrix} = \begin{bmatrix} 2\sqrt{21.8} & 2\sqrt{25.5} & 2\sqrt{25.5} \\ 2\sqrt{34} & 2\sqrt{5.3} & 2\sqrt{42.5} \\ 2\sqrt{50.8} & 2\sqrt{0} & 2\sqrt{0} \end{bmatrix}^{-1} \begin{bmatrix} 72.8(1+\cos\theta_1) \\ 81.8(1+\cos\theta_2) \\ 50.8(1+\cos\theta_3) \end{bmatrix}$$ [Numeral 5]

The dispersion component $\gamma_s^a$, dipole component $\gamma_s^b$, and hydrogen bond component $\gamma_s^c$ of the surface of the press-molding glass material fabricated as set forth above were thus calculated.

Finally, the surface free energy $\gamma_s$ of the press-molding glass material that had been fabricated was calculated by the following equation based on the above results:

$$\gamma_s = \gamma_s^a + \gamma_s^b + \gamma_s^c$$

3. Identification of Silicon Oxide Film and Calculation of Film Thickness

The silicon oxide film formed on the surface of the press-molding glass material fabricated in 1. above was identified by analyzing the composition of the glass surface with an X-ray photoelectron spectroscope (XPS) attached to an electron microscope (SEM), or an energy-dispersive X-ray spectroscope (EDX). The thickness of the silicon oxide film was measured by masking a portion of a flat sheet of glass, forming a silicon oxide film on the flat sheet of glass under the same conditions as when forming the silicon oxide film on the glass material, peeling off the mask, observing the difference in height between the portion on which the film had been formed and the masked portion by an atomic force microscope (AFM), and adopting the film thickness thus measured as the thickness of the silicon oxide film formed on the surface of the press-molding glass material.

4. Fabrication of a Glass Lens

Figure 3:
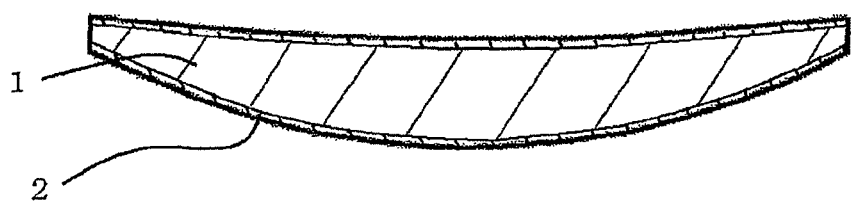
FIG. 3 is a sectional view of a glass optical element obtained from the glass molded article shown in FIG. 2.

Next, the above glass material PF was press molded in a nitrogen gas atmosphere with a mold press molding device. That is, a mold, comprised of upper and lower molds made of SiC with molding surfaces on which a carbon-containing mold release film had been formed by sputtering, and a sleeve mold holding the upper and lower molds on a single axis, was employed. The glass material PF was fed into the mold so as to hold the glass material PF between the upper and lower molds. The mold was then introduced into the chamber of a pressing device filled with a nonoxidizing atmosphere in the form of $N_2$ gas, and the mold and glass material PF were heated to 580° C. Next, the mold was pressed at 120 kg/cm² and cooled at a prescribed cooling rate. When the temperature of the mold reached 460° C., the pressure was terminated. Next, the mold was rapidly cooled. When the mold reached equal to or lower than 300° C., it was removed from the chamber and opened. The press molded article within the mold was removed. The sectional shape of the molded was as shown in FIG. 2, the outer diameter dimension d was 21.5 mm and the center thickness was 2.65 mm. That is, the rate of change in the outer dimension due to press molding was 22.2 percent, and the rate of change in the center thickness was 18.2 percent. Next, the outer perimeter portion of the press molded article was centered and edged by grinding, yielding the aspherical glass lens of convex meniscus shape 18 mm in diameter that is shown in FIG. 3.

5. Surface Free Energy Measurement Results

Figure 5A:
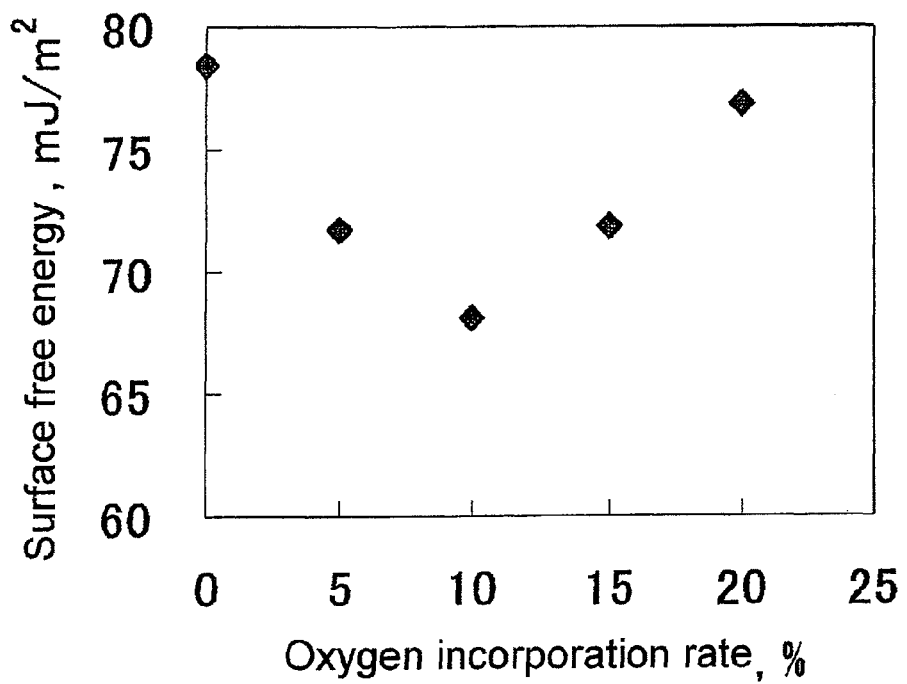
FIG. 5(A) is a graph showing the correlation between the oxygen content in a sputtering gas and surface free energy.
Figure 5B:
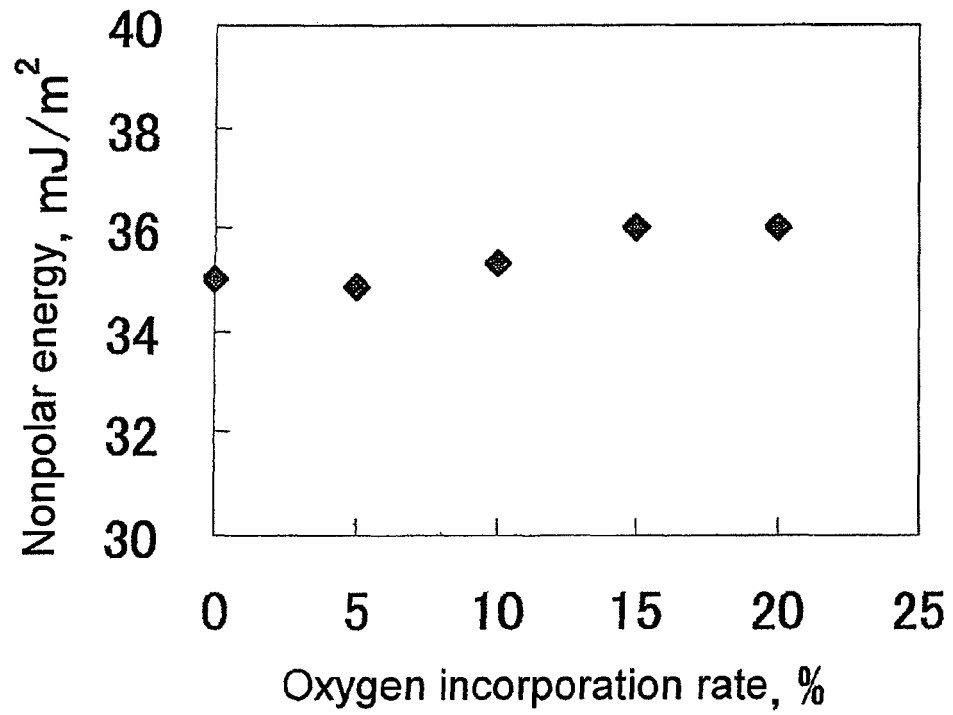
FIG. 5(B) is a graph showing the correlation between the oxygen content in a sputtering gas and nonpolar components that are constituents of surface energy.
Figure 5C:
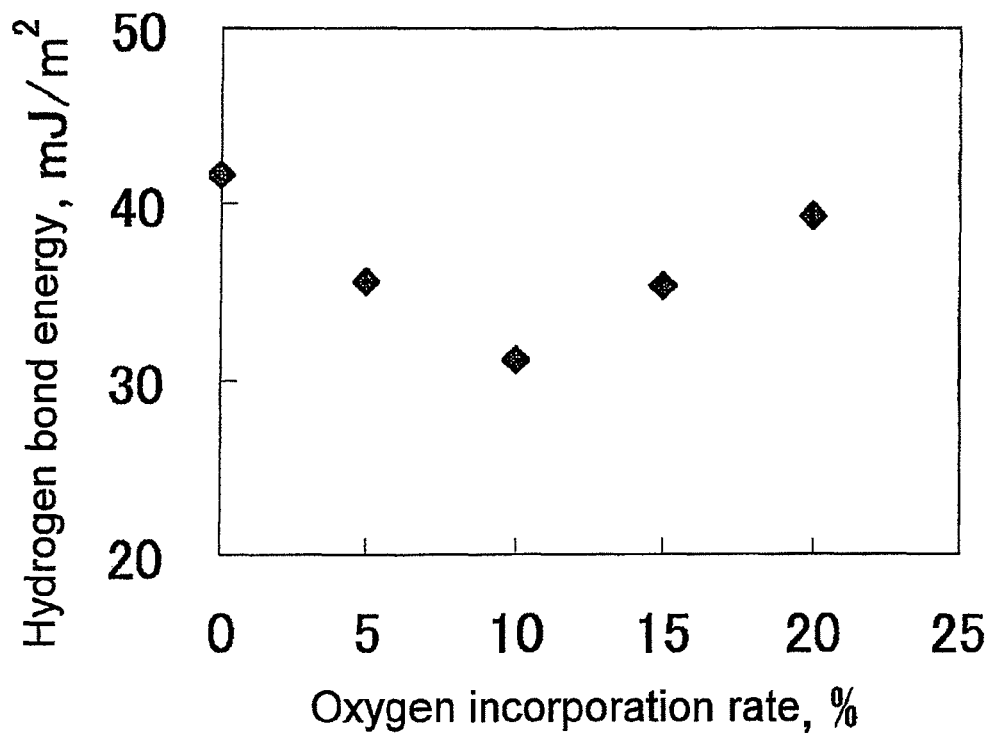
FIG. 5(C) is a graph showing the correlation between the oxygen content in a sputtering gas and hydrogen bond components that are constituents of surface energy.
Figure 5D:
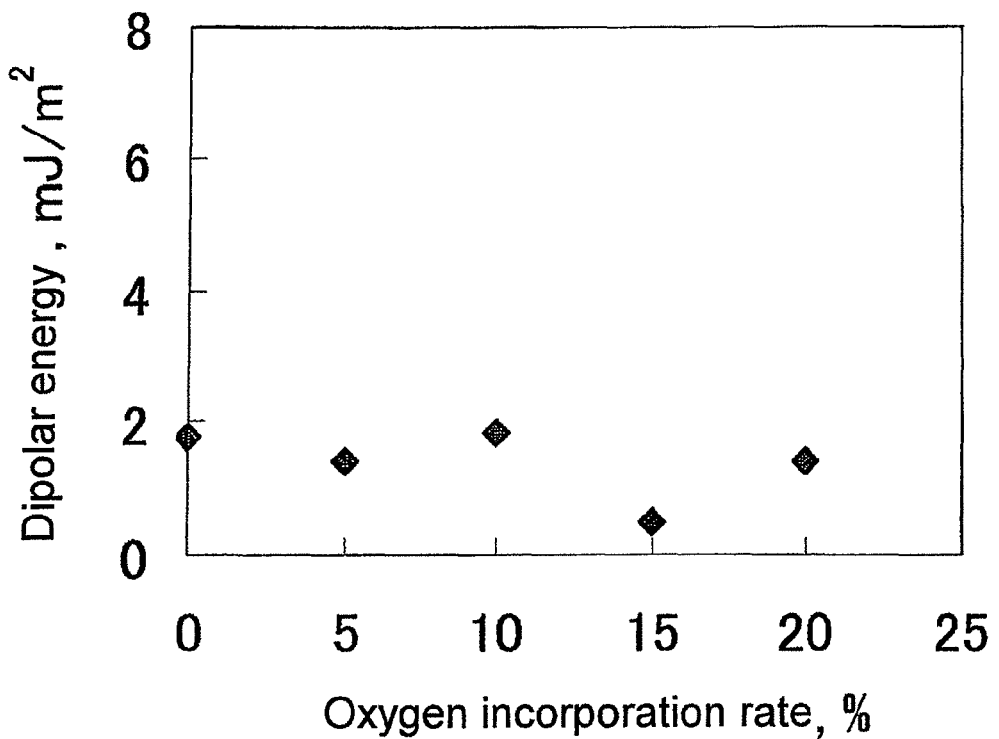
FIG. 5(D) is a graph showing the correlation between the oxygen content in a sputtering gas and dipolar components that are constituents of surface energy.

FIG. 5(A) gives the surface free energies by the three-liquid method of press-molding glass materials obtained by an identical period of sputtering (5 minutes) for sputtering gas oxygen incorporation rates of 5 volume percent, 10 volume percent, 15 volume percent, and 20 volume percent. FIGS. 5(B) to (D) give the nonpolar component, hydrogen bond component, and dipolar components—which are the constituent components of the surface free energy shown in FIG. 5.

Based on the results given in FIGS. 5(A) to (D), at oxygen incorporation rates of equal to or greater than 5 volume percent but less than 20 volume percent, the fact that the surface free energy by the three-liquid method was equal to or lower than 75 mJ/m² was determined to be primarily due to a reduction in the hydrogen bond component.

6. Evaluation of the Yield

Various silicon oxide films were formed by varying the sputtering time and the oxygen incorporation rate in the sputtering gas. When the silicon oxide films formed were identified by the method described in 3. above, both silicon and oxygen were detected on the glass surface in all cases. Thus, the fact that a silicon oxide film had been formed on the surface of the press-molding glass materials by sputtering was confirmed.

Each time film formation processing was conducted, a total of 360 pieces of press-molding glass material were fabricated, samples for measuring the surface free energy were extracted from the pieces of glass material obtained, and the surface free energy was measured by the method described in 2. above. The measurement results are given in Table 3 below. The film thickness values given in Table 3 were measured by the method described in 3. above.

Next, press molding was continuously conducted by the method described in 4. above using the press-molding glass material that had been obtained. The glass lenses obtained were irradiated with transmitted light, and a determination was visually made as to the presence or absence of defects thought to be caused by fusion to the mold. Of the 360 glass lenses fabricated by press molding, the ratio of product not determined to be clearly defective in terms of external appearance or shape to a degree precluding shipment as finished product is given in Table 3 as the yield. In Comparative Examples 1 and 2, with an oxygen incorporation rate of 0 percent, the press-molding glass material fused to the pressing mold during the first pressing cycle, making it impossible to obtain glass lenses.

TABLE 3

|  | Oxygen incorporation rate, % | Film thickness, nm | Surface free energy, mJ/m$^2$ | Yield, % |
| --- | --- | --- | --- | --- |
| Comp. Ex. 1 | 0 | 10 | 78.4 | 0 |
| Comp. Ex. 2 |  | 15 | 77.2 | 0 |
| Ex. 1 | 5 | 10 | 71.7 | 65 |
| Ex. 2 | 10 | 10 | 68.2 | 96 |
| Ex. 3 | 15 | 10 | 71.9 | 80 |
| Comp. Ex. 3 | 20 | 3 | 76.0 | 60 |
| Comp. Ex. 4 |  | 10 | 77.0 | 10 |

7. Evaluation of the Service Lifetime of the Mold

Various silicon oxide films were formed by varying the sputtering time and the oxygen incorporation rate in the sputtering gas. When the silicon oxide films that were formed were identified by the method described in 3. above, silicon and oxygen were detected from the glass surface in all cases. Thus, the fact that silicon oxide films had been formed on the surface of the press-molding glass materials by sputtering was confirmed.

Each time film formation processing was conducted, a total of 360 pieces of press-molding glass material were fabricated, samples for measuring the surface free energy were extracted from the pieces of glass material obtained, and the surface free energy was measured by the method described in 2. above. The measurement results are given in Table 4 below. The film thickness values given in Table 4 were measured by the method described in 3. above.

Next, press molding was continuously conducted by the method described in 4. above using the press-molding glass material that had been obtained. After each cycle of pressing, a microscope was used to observe the surface of the pressing mold by observation with reflected light. The number of pressing cycles that had been conducted when traces due to fusion of the press-molding glass material were clearly observed on the surface of the pressing mold is given in Table 4 as the service lifetime of the mold.

TABLE 4

|  | Oxygen incorporation rate, % | Film thickness, nm | Surface free energy, mJ/m$^2$ | Service lifetime of the mold |
| --- | --- | --- | --- | --- |
| Comp. Ex. 5 | 0 | 10 | 78.4 | 0 |
| Comp. Ex. 6 |  | 15 | 77.2 | 0 |
| Comp. Ex. 7 | — | 0 (No film was present) | 76.6 | 0 |
| Ex. 4 | 10 | 5 | 72.4 | 60 |
| Ex. 5 |  | 10 | 68.2 | 200 or more |
| Ex. 6 |  | 12 | 69.6 | 100 |
| Comp. Ex. 8 |  | 15 | 64.3 | 30 |

8. Effect of Silicon Oxide Film Thickness (Comparative Example 8)

Figure 6A:
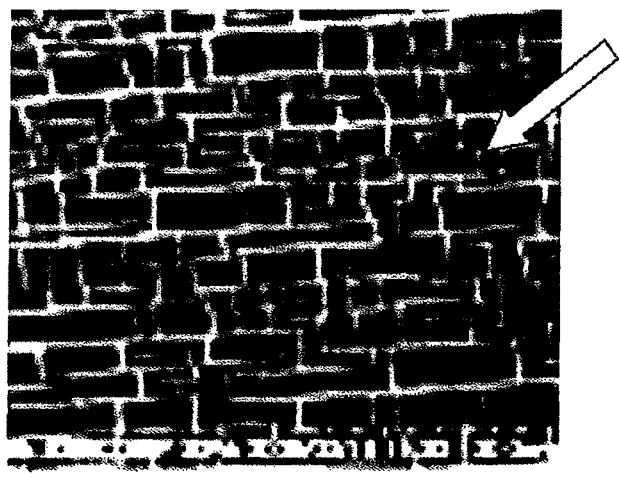
FIG. 6(A) is a SEM image showing the surface state following pressing of a press-molding glass material on which a silicon oxide film has been formed to a thickness of 15 nm.
Figure 6B:
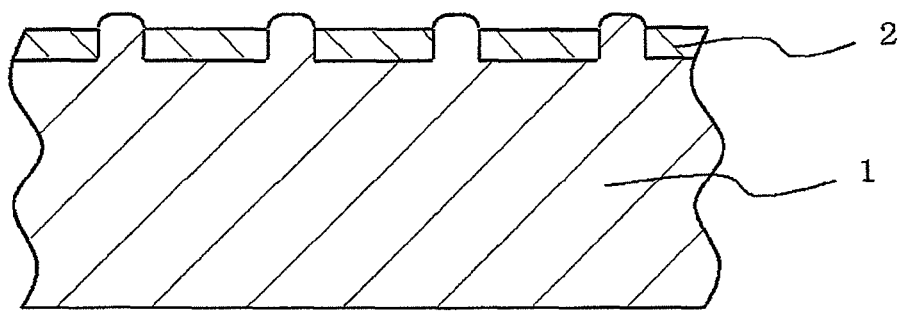
FIG. 6(B) is a drawing of a typical cross-section of the pressing material shown in 6(A).

The surface free energy of the press-molding glass material of Comparative Example 8, in which a silicon oxide film 15 nm in thickness was fabricated with a 10 volume percent oxygen incorporation rate in the sputtering gas, was measured by the method described in 2. above at 64.3 mJ/m$^2$, as indicated in Table 4. However, when press molding was conducted using this press-molding glass material by the method described in 4. above, pronounced fusion to the pressing mold occurred. Accordingly, the surface of the glass material was observed by a scanning electron microscope (measurement conditions: low vacuum mode, an acceleration voltage of 3 keV) following press molding. The SEM image obtained is shown in FIG. 6(A). FIG. 6(B) is a typical rendering of the cross-section of the glass material shown in FIG. 6(A) based on the SEM image shown in FIG. 6(A). The spots appearing more brightly than surrounding spots, such as the portion indicated by the arrow in FIG. 6(A), are portions differing greatly in composition from surrounding portions. As shown in FIG. 6(B), this means that cracks formed in silicon oxide film 2 and a portion of the glass constituting core part 1 spewed out through the cracked portion of silicon oxide film 2. Direct contact with the pressing mold by glass spewing out through the silicon oxide film in this manner caused pronounced fusion.

Evaluation Results

As shown in Table 3, in Examples 1 to 3, in which press molding was conducted with a press-molding glass material that had a silicon oxide film less than 15 nm in thickness with a surface free energy of equal to or lower than 75 mJ/m$^2$, it was possible to ensure a yield of equal to or higher than 65 percent. The non-defective glass lenses obtained in Examples 1 to 3 all exhibited good external appearance and shape. Among them, the non-defective glass lenses obtained in Example 2 exhibited particularly good external appearance and shape.

By contrast, press molding was impossible in Comparative Examples 1 and 2, as stated above. In Comparative Examples 3 and 4, in which press molding was conducted with press-molding glass materials with surface free energies exceeding 75 mJ/m$^2$ despite silicon oxide films less than 15 nm in thickness, the yield was lower than in Examples 1 to 3. In Comparative Example 3, in which a relatively good yield among the comparative examples of 60 percent was achieved, when the pressing load was raised above 120 kg/cm$^2$, pronounced fusion to the pressing mold occurred in the first pressing cycle. Thus, a yield of 60 percent could only be ensured under low load conditions. By contrast, in Examples 1 to 3, even when the pressing load was raised above 120 kg/cm$^2$, glass lens yields equivalent to the results given in Table 3 were achieved. The non-defective product obtained in Comparative Example 4 was poorer in external appearance and shape than the non-defective products obtained in Examples 1 to 3.

As shown in Table 4, as regards the service lifetime of the mold, pronounced fusion occurred during the first cycle of press molding in Comparative Example 5, in which press molding was conducted using a press-molding glass material with a surface free energy exceeding 75 mJ/m$^2$ despite having a silicon oxide film less than 15 nm in thickness; in Comparative Example 6, in which press molding was conducted with a press-molding glass material having a surface free energy exceeding 75 mJ/m$^2$ and a silicon oxide film 15 nm in thickness; and in Comparative Example 7, in which no silicon oxide film was formed. By contrast, in Examples 4 to 6, in which press molding was conducted with press-molding glass materials having surface free energies of equal to or lower than 75 mJ/m$^2$ and silicon oxide films less than 15 nm in thickness, continuous press molding was possible without the occurrence of fusion. Among these, in Example 5, continuous press molding was possible for equal to or more than 200 cycles without fusion.

As indicated in Comparative Example 8, when the thickness of the silicon oxide film exceeded 15 nm despite the press-molding glass material having a surface free energy of equal to or lower than 75 mJ/m$^2$, the glass material fused to the mold during press molding, reducing the service lifetime of the mold.

Based on the above results, it was determined that the yield and the service lifetime of the mold could be enhanced by conducting press molding with a press-molding glass material having a surface free energy of equal to or lower than 75 mJ/m$^2$ and a silicon oxide film less than 15 nm in thickness.

The present invention is useful in the field of manufacturing optical elements, such as glass lenses.

The invention claimed is:

1. A press-molding glass material, which comprises a core part comprised of optical glass and a silicon oxide film of less than 15 nm in thickness covering at least a portion of the core part, the portion being to be an optically functional surface, as well as has a surface free energy that is given by the sum of a nonpolar component and a hydrogen bond component and a dipolar component as measured by a three-liquid method of equal to or lower than 75 mJ/m$^2$.

2. The press-molding glass material according to claim 1, wherein the optical glass comprises at least one readily reduced component selected from the group consisting of W, Ti, Bi, and Nb.

3. The press-molding glass material according to claim 1, wherein the optical glass comprises, denoted as mole percentages, 10 to 45 percent of $P_2O_5$, 3 to 35 percent of $Nb_2O_5$, 0 to 35 percent of $Li_2O$, 0 to 25 percent of $TiO_2$, 0 to 20 percent of $WO_3$, 0 to 40 percent of $Bi_2O_3$, 0 to 20 percent of $B_2O_3$, 0 to 25 percent of BaO, 0 to 25 percent of ZnO, 0 to 50 percent of $Na_2O$, 0 to 20 percent of $K_2O$, 0 to 15 percent of $Al_2O_3$, 0 to 15 percent of $SiO_2$, and 0 to 10 percent of F relative to a total quantity of oxygen.

4. A press-molding glass material as claimed in claim 1, wherein the silicon oxide film is a film that has been formed by film formation processing conducted in a mixed gas atmosphere of an inert gas and oxygen with an oxygen content falling within a range of equal to or higher than 5 volume percent but less than 20 volume percent.

5. A method of manufacturing a press-molding glass material, which comprises a core part comprised of optical glass and a silicon oxide film of less than 15 nm in thickness covering at least a portion of the core part, the portion being to be an optically functional surface, as well as has a surface free energy that is given by the sum of a nonpolar component and a hydrogen bond component and a dipolar component as measured by a three-liquid method of equal to or lower than 75 mJ/m$^2$, wherein the method comprises conducting film formation processing with a film-forming material comprised of $SiO_2$ in an atmosphere with an oxygen content falling within a range of equal to or higher than 5 volume percent but less than 20 volume percent to form the silicon oxide film on the above portion of the core part.

6. The method of manufacturing a press-molding glass material according to claim 5, wherein the film formation processing is conducted by a sputtering method.

7. A method of manufacturing an optical element, which comprises heating and precision press molding with a pressing mold a press-molding glass material which comprises a core part comprised of optical glass and a silicon oxide film of less than 15 nm in thickness covering at least a portion of the core part, the portion being to be an optically functional surface, as well as has a surface free energy that is given by the sum of a nonpolar component and a hydrogen bond component and a dipolar component as measured by a three-liquid method of equal to or lower than 75 mJ/m$^2$.

8. A method of manufacturing an optical element, which comprises heating and precision press molding with a pressing mold a press-molding glass material manufactured by the method according to claim 5.

* * * * *